H. J. DAVIES.

MACHINES FOR PRINTING AND EMBOSSING SKIRTS.

No. 6,892. Reissued Feb. 1, 1876.

Witnesses:
Fred Haynes
Edward B. Spurry

Henry J. Davies
By his Attorneys
Brown & Allen.

UNITED STATES PATENT OFFICE.

HENRY J. DAVIES, OF BROOKLYN, NEW YORK, ASSIGNOR TO JAMES G. BENNETT AND ANDREW H. SMITH, OF SAME PLACE.

IMPROVEMENT IN MACHINES FOR PRINTING AND EMBOSSING SKIRTS.

Specification forming part of Letters Patent No. 137,181, dated March 25, 1873; reissue No. 6,396, dated February 1, 1876; application filed January 29, 1876.

*To all whom it may concern:*

Be it known that I, HENRY J. DAVIES, of Brooklyn, in the county of Kings and State of New York, have invented certain Improvements in Printing Skirts and other articles; and I do hereby declare that the following is a full, clear, and exact description of the same.

This invention is more particularly designed for the printing of ladies' skirts and like articles, or other articles of circular or partly circular form. It will suffice here, however, to describe the invention as applied to the printing of ladies' skirts.

The invention consists in a combination, in a machine for printing fabric for skirts and other articles, of one or more conical printing-rollers and a conical impression-roller, arranged to operate together substantially as hereinafter described.

The invention also consists in a combination of one or more conical printing-rollers, a conical impression-roller, an open-sided frame supporting the said rollers, and a feed-table, over which the fabric to be printed is conducted to the rollers, the whole affording great facility for printing skirts and other like-shaped articles.

The invention also consists in the combination of one or more conical printing-rollers, mounted in an open-ended frame, and a supporting impression-surface, the two co-operating to print a design in the arc of a circle upon a fabric.

Figure 1:
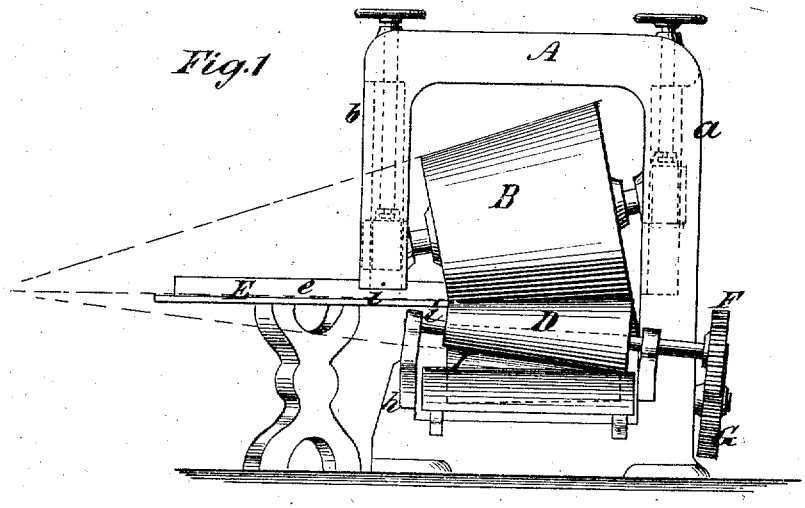
Figure 2:
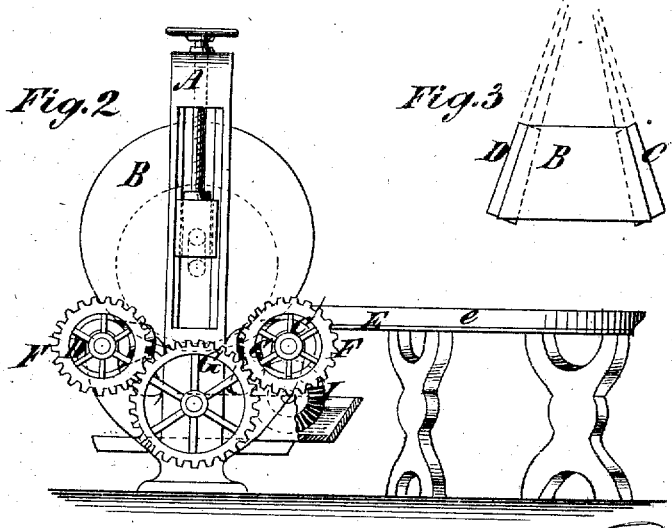
Figure 3:
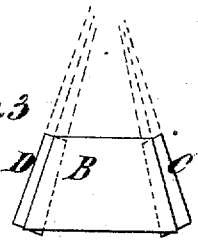

In the accompanying drawing, Figure 1 is a side view of a machine constructed according to my invention. Fig. 2 is a back view of the same; and Fig. 3 is a diagram, showing the taper and relative convergence of the rollers.

In the example here selected by way of illustrating my invention, I have shown two printing-rollers as combined with one impression-roller. One of these printing-rollers will be described as constructed for printing in colors, and has combined with it an inking or coloring roller and fountain, while the other of said printing-rollers will be described as constructed for merely printing by ornamenting in relief or without color. Either or both modes of printing or kinds of printing-surfaces may be used, the invention not being restricted to any particular description of printing.

In the drawing, A is a frame of suitable shape for supporting the rollers. It is here represented as consisting of a base-piece from one side of which there projects upwardly a standard, *a*, which extends across in a horizontal direction, and terminates in a downward extension, *b*, parallel with the upright portion *a* just mentioned. It has also opposite the standard *a*, and under the downward extension *b*, a short standard, *h*, between which and the extension *b* there is an opening, *i*. The frame thus constructed is an open-sided one on its one side, to adapt the machine to operate on only a portion of the width of the fabric. B is the impression-roller, which may be covered with flannel, felt, or other like material, to give it a yielding surface. Its journals are supported in bearings arranged within housings provided in the portions *a* and *b* of the frame. These bearings are provided with suitable means for lowering and raising them, to increase or lessen the pressure of said roller on the printing roller or rollers. There being two printing-rollers here shown, for operation in concert with one and the same impression-roller, the one C of these, which is constructed to print a colored pattern on the surface of the fabric, may be supported in bearings *c c*, projecting from the forward side of the frame, and the other printing-roller D, which is constructed to print without color a raised pattern on the surface of the fabric, may be supported in corresponding bearings on the other side of the frame. The axes of these two printing-rollers and the axis of the impression-roller all converge toward a central point, and all the rollers taper to the same point. This point is here represented as so situated that the lines of contact of the impression-roller with the printing-rollers are horizontal. E is a feed-table, the surface of which is also horizontal, and in, or nearly in, the same plane with the lines of contact of the print-rollers with the impression-roller, and opposite the opening *i* in the one side of the frame of the machine. This feed-table is represented as of arc form, with its edges struck from the point in which the axes and profile lines B, C, and D would meet. It may, if desired, be furnished on the outer side with a guide, *e*, for guiding the goods to be operated on to the rollers, such guide conforming to the arc shape of the table.

The printing-rollers C and D may be geared to turn together by means of spur-wheels F F on their journals, and an intermediate gear, G. These wheels F F it is desirable to so attach to the rollers as to be adjustable relatively to them, in order to get the patterns of both to register exactly alike. The surface of the printing-roller D may be precisely like that of the printing-roller C, excepting that its pattern is cut much deeper. This roller D is heated by any suitable means, either from the interior or exterior, as may be most convenient. I is the inking or coloring roller for the printing-roller C. It is arranged in a box or trough of the coloring matter, in such position as to rotate in contact with the printing-roller C, and apply the color to the latter.

The skirt to be ornamented is fed over the feed-table E, with its edge, if necessary, against the guide *e*, and is thus conducted to the impression and printing rollers while moving in the proper direction to pass smoothly between them, its admission between said rollers being provided for by the opening *i* in one side of the frame, which permits its entrance. In its passage between the impression-roller B and the color printing-roller C the pattern of the latter is imparted to it in color, and as it moves farther along and passes between the impression-roller B and the other printing-roller D, the pattern of this last-named roller, and which may correspond with the pattern of the roller C, is raised upon the fabric. The printing-roller D, as before mentioned, may be heated; and as the skirt, wet with the pattern printed on it by the roller C, passes over the roller D, the yielding surface of the impression-roller B bulges out into the intaglio portions of the pattern, and of course forces the contiguous portions of the skirt in with it, and this is facilitated by the heating of the skirt by contact with the hot printing-roller D. Instead, however, of the roller D being constructed to print in relief and without color, it may be constructed, like the roller C, for printing in color, and so that it prints a portion of the pattern in a different color from the rest.

The pressure of the impression-roller B may be readily varied by shifting its bearings.

Sometimes the whole skirt is passed between the impression and printing rollers, and at other times only the edge is interposed between them, the rest of the article hanging over the inner end of said rollers.

I claim—

1. In a machine for printing fabric for skirts and other articles, the combination of one or more conical printing-rollers and a conical impression-roller, arranged to operate together substantially as specified.

2. The combination of one or more conical printing-rollers, a conical impression roller, arranged for operation in concert with the latter, an open-sided frame supporting said rollers, and a feed table, over which the goods are fed to the rollers, essentially as herein described, for the purpose set forth.

3. The combination of one or more conical printing-rollers, mounted in an open-ended frame, and a supporting impression-surface, the two co-operating to print a design in the arc of a circle upon a fabric, substantially as described.

HENRY J. DAVIES.

Witnesses:

BENJAMIN W. HOFFMAN,
HENRY T. BROWN.